(12) United States Patent
Bogan (10) Patent No.: US 12,548,191 B2
(45) Date of Patent: *Feb. 10, 2026

(54) SYSTEM AND METHOD FOR EFFICIENTLY SCORING PROBES IN AN IMAGE WITH A VISION SYSTEM (71) Applicant: Cognex Corporation, Natick, MA (US)

(72) Inventor: Nathaniel R. Bogan, Natick, MA (US)

(73) Assignee: Cognex Corporation, Natick, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/208,660

(22) Filed: Jun. 12, 2023

(65) Prior Publication Data

US 2024/0135583 A1 Apr. 25, 2024
US 2024/0233177 A9 Jul. 11, 2024

Related U.S. Application Data (63) Continuation of application No. 17/013,788, filed on Sep. 7, 2020, now Pat. No. 11,676,301, which is a
(Continued)

(51) Int. Cl.
G06T 7/73 (2017.01)
G06F 18/28 (2023.01)
(Continued)

(52) U.S. Cl.
CPC ............... *G06T 7/75* (2017.01); *G06F 18/28* (2023.01); *G06T 7/001* (2013.01); *G06T 7/344* (2017.01);
(Continued)

(58) Field of Classification Search
CPC ........... G06T 7/75; G06T 7/001; G06T 7/344; G06T 2207/20081; G06T 2207/30164;
(Continued)

(56) References Cited

U.S. PATENT DOCUMENTS 4,581,762 A 4/1986 Lapidus
4,876,457 A 10/1989 Bose
(Continued)

FOREIGN PATENT DOCUMENTS

CN 103377382 A 10/2013
EP 1193642 A1 4/2002
(Continued)

OTHER PUBLICATIONS

"Dot Product." Math Is Fun, https://www.mathsisfun.com/algebra/vectors-dot-product.html. Accessed Nov. 8, 2018. (Year: 2018).
(Continued)

Primary Examiner — Wesley J Tucker
(74) Attorney, Agent, or Firm — Loginov & Associates, PLLC; William A. Loginov (57) ABSTRACT A system and method for scoring trained probes for use in analyzing one or more candidate poses of a runtime image is provided. A set of probes with location and gradient direction based on a trained model are applied to one or more candidate poses based upon a runtime image. The applied probes each respectively include a discrete set of position offsets with respect to the gradient direction thereof. A match score is computed for each of the probes, which includes estimating a best match position for each of the probes respectively relative to one of the offsets thereof, and generating a set of individual probe scores for each of the probes, respectively at the estimated best match position.

19 Claims, 9 Drawing Sheets

Related U.S. Application Data continuation of application No. 15/429,336, filed on Feb. 10, 2017, now Pat. No. 10,769,776.

(60) Provisional application No. 62/294,430, filed on Feb. 12, 2016.

(51) Int. Cl.

| | | |
|---|---|---|
| *G06T 7/00* | (2017.01) | |
| *G06T 7/33* | (2017.01) | |
| *G06V 10/44* | (2022.01) | |
| *G06V 10/46* | (2022.01) | |
| *G06V 10/75* | (2022.01) | |
| *G06V 10/772* | (2022.01) | |

(52) U.S. Cl.
CPC .............. *G06V 10/44* (2022.01); *G06V 10/46* (2022.01); *G06V 10/752* (2022.01); *G06V 10/772* (2022.01); *G06T 2207/20081* (2013.01); *G06T 2207/30164* (2013.01); *G06V 2201/06* (2022.01)

(58) Field of Classification Search
CPC . G06T 7/73; G06T 2207/30204; G06F 18/28; G06V 10/44; G06V 10/46; G06V 10/752; G06V 10/772; G06V 2201/06; G06V 10/255; G06V 10/754; G06V 10/757
See application file for complete search history.

(56) References Cited

U.S. PATENT DOCUMENTS

| | | | |
|---|---|---|---|
| 5,640,200 | A | 6/1997 | Michael |
| 5,761,070 | A | 6/1998 | Cormers |
| 5,850,466 | A | 12/1998 | Schott |
| 5,912,984 | A * | 6/1999 | Michael .................. G06T 7/001 |
| | | | 382/181 |
| 5,995,663 | A | 11/1999 | Itsuzaki |
| 6,052,489 | A * | 4/2000 | Sakaue .................... G06T 7/13 |
| | | | 382/199 |
| 6,094,508 | A | 7/2000 | Acharya |
| 6,175,644 | B1 | 1/2001 | Scola |
| 6,175,652 | B1 | 1/2001 | Jacobson |
| 6,636,298 | B1 | 10/2003 | Bachelder |
| 7,003,161 | B2 | 2/2006 | Tessadro |
| 7,016,539 | B1 * | 3/2006 | Silver ..................... G06F 18/22 |
| | | | 382/216 |
| 7,162,073 | B1 | 1/2007 | Akgul |
| 7,190,832 | B2 | 3/2007 | Frost |
| 7,567,713 | B2 | 7/2009 | Ding |
| 8,379,014 | B2 | 2/2013 | Wiedemann |
| 10,769,776 | B2 * | 9/2020 | Bogan ...................... G06T 7/75 |
| 10,846,563 | B2 * | 11/2020 | Liu .................... G06V 30/2504 |
| 11,676,301 | B2 * | 6/2023 | Bogan .................... G06F 18/28 |
| | | | 382/152 |
| 2002/0181762 | A1 | 12/2002 | Silber |
| 2004/0037465 | A1 | 2/2004 | Krause |
| 2004/0170323 | A1 | 9/2004 | Cootes |
| 2009/0257621 | A1 | 10/2009 | Silver |
| 2010/0034484 | A1 * | 2/2010 | Kido .................... G06V 10/751 |
| | | | 382/294 |
| 2010/0086218 | A1 | 4/2010 | Tateno |
| 2010/0183225 | A1 | 7/2010 | Vantaram |
| 2010/0202701 | A1 | 8/2010 | Basri |
| 2014/0270362 | A1 | 9/2014 | Najafi Shoushtari |
| 2015/0016731 | A1 | 1/2015 | Kitajima |
| 2015/0049915 | A1 | 2/2015 | Ciurea |
| 2015/0104068 | A1 * | 4/2015 | Shivaram .................. G06T 7/74 |
| | | | 382/103 |
| 2016/0054119 | A1 | 2/2016 | Kanto |
| 2016/0216107 | A1 | 7/2016 | Barker |
| 2020/0082230 | A1 * | 3/2020 | Hoelscher ................ G06T 7/75 |
| 2020/0082566 | A1 * | 3/2020 | Bogan ...................... G06T 7/75 |

FOREIGN PATENT DOCUMENTS

| | | |
|---|---|---|
| JP | 2002157591 A | 5/2002 |
| JP | 2010067247 | 3/2010 |
| WO | 2014156723 A1 | 10/2014 |

OTHER PUBLICATIONS

Blake et al., "Normal Displacement in Curve Fitting", "Active Contours", Apr. 1, 1998, pp. 120-126, Published in: USA.

Christian Schlosser, et al, "Automatic car detection in high resolution urban scenes based on an adaptive 3D-model", 2003 2nd GRSS/ISPRS Joint Workshop on Remote Sensing and Data Fusion over Urban Areas, IEEE, May 22, 2003, p. 167-171.

Kiyoshi Kiyokawa, outside trinominal, "the one operation assistive hand method in the cooperation joining manipulation of two or more virtual bodies", The Journal of The Institute of Image Information and Television Engineers, Japan, Institute of Image Information and Television Engineers, Jul. 20, 1997, the 51st volume, No. 7, p. 1079-1085.

\* cited by examiner

SYSTEM AND METHOD FOR EFFICIENTLY SCORING PROBES IN AN IMAGE WITH A VISION SYSTEM

RELATED APPLICATIONS

This application is a continuation of U.S. patent application Ser. No. 17/013,788, entitled SYSTEM AND METHOD FOR EFFICIENTLY SCORING PROBES IN AN IMAGE WITH A VISION SYSTEM, filed Sep. 7, 2020, which is a continuation of U.S. patent application Ser. No. 15/429,336, entitled SYSTEM AND METHOD FOR EFFICIENTLY SCORING PROBES IN AN IMAGE WITH A VISION SYSTEM, filed Feb. 10, 2017, now U.S. Pat. No. 10,769,776, issued Sep. 8, 2020, which claims the benefit of U.S. Provisional Application Ser. No. 62/294,430, entitled SYSTEM AND METHOD FOR EFFICIENTLY SCORING PROBES IN AN IMAGE WITH A VISION SYSTEM, filed Feb. 12, 2016, the teachings of each of which applications are expressly incorporated herein by reference.

FIELD OF THE INVENTION

This invention relates to machine vision systems and more particularly to systems and methods for aligning a trained image with respect to a candidate poses of a runtime image.

BACKGROUND OF THE INVENTION

Machine vision systems, also termed "vision systems" herein, are used to perform a variety of tasks in a manufacturing environment. In general, a vision system consists of one or more cameras with an image sensor (or "imager") that acquires grayscale, color and/or three-dimensional (3D) range/depth/height image data of a scene that contains an object under manufacture. Images of the object can be analyzed to provide data/information to users and associated manufacturing and/or other processes. The data produced by the image is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well known PatMax® system commercially available from Cognex Corporation of Natick, MA, compares features in an image of a scene to a trained (using an actual or synthetic model) pattern, and determines the presence/absence and pose of the pattern in the imaged scene. This information can be used in subsequent inspection (or other) operations to search for defects and/or perform other operations, such as part rejection.

Such vision system tasks can perform alignment by computing a meaningful match score for a given pose of a trained model in a runtime two-dimensional (2D) (e.g. greyscale) image. The score can be used, for example, to determine which candidate poses are true instances of the model, to select the best available candidates, or for other classification and/or decision purposes.

It is often challenging to compute a score and determine alignment when the acquired, runtime image includes deformation or other variations from the expected model image. Such deformation can be the result of minor defects of the object surface, or can result from optical issues—such as variation in viewing angle, uneven illumination partial occlusion of the field of view, shadowing, etc. In order to effectively score a pose, some deformation should be accounted for in the process. Likewise, vision system camera-lens distortion, which can be non-linear can be present, and can be challenging to address and require high processing overhead.

A common technique for aligning a trained model with a runtime image involves the use of probes, which generally comprise a series of locations corresponding to points on the model that define a gradient. Probes are positioned with respect to a candidate pose in the runtime image and are scored to determine the extent to which the candidate pose matches the expected model characteristics defined by the probes.

A prior technique for performing probe matching of candidate poses, in the presence of a deformation, involves extraction of "featurelets" from the runtime image and attempting to match the featurelets. It consists of extracting the sub-pixel position of individual edge transitions from the image. Each corresponds roughly to a section of boundary that is (e.g.) one pixel in length. Once these featurelets are extracted, a neighborhood search around each probe can determine if there is a potential matching feature, and credit is given in the score if a match occurs. However, this approach has two key deficiencies. First, it requires a hard contrast threshold to determine what is and is not a sufficiently strong gradient change to be called a feature. When image features are near to this hard threshold, the behavior of extraction can be unstable. Second, extracting the featurelets is computationally expensive, as it requires determining the gradient at every location, computing the angles of gradient directions (as opposed to just their x and y components), and performing non-peak suppression to leave only the locations with locally strongest gradient. Thus, this approach can be less rapid and efficient than desired.

Another prior technique for matching a trained model is to score a "smoothed" runtime image. It consists of smoothing the image (e.g. by applying a Gaussian filter) and (optionally) downsampling the image. The image is then scored (e.g.) exactly at the transformed probe location (mapped correctly to the downsampled coordinates if appropriate). This implicitly tolerates some local deformation, because nearby features have been blurred such that they overlap the probe location. Again, this approach has two key deficiencies. First, smoothing destroys information and therefore can eliminate a true matching feature, resulting in a score lower than desired. Second, smoothing can creates one or more new locations with strong gradient, and therefore can create false matching features, resulting in a score higher than desired.

SUMMARY OF THE INVENTION

This invention overcomes disadvantages of the prior art by providing a system and method for scoring probes used in aligning a trained model image to candidate poses of a runtime image that allows for some local deformation that is not explicitly part of the pose transform, but that avoids blurring and/or downsampling runtime image data or performing an excess of computationally expensive operation on the runtime image. The accommodation of this deformation does not significantly decrease the score. Advantageously, the score can be computed rapidly and generally free of a requirement to perform any explicit runtime feature extraction on the acquired image.

In an illustrative embodiment a system and method for scoring trained probes for use in analyzing one or more candidate poses of a runtime image is provided. A set of probes with location and gradient direction based on a trained model, generated during a training stage, are applied to one or more candidate poses based upon a runtime image. The applied probes each respectively include a discrete set of position offsets with respect to the gradient direction thereof. A match score is computed for each of the probes, which includes estimating a best match position for each of the probes respectively relative to one of the offsets thereof, and generating a set of individual probe scores for each of the probes, respectively at the estimated best match position.

Illustratively, the set of probes are generated in a training step with a position and a direction that represents the trained model. A total score can be generated, that is a weighted sum or product of the individual probe scores, the computing of the total score operates either (a) concurrently as the probe scores are generated, or (b) subsequent to generating of some or all of the probe scores. A best alignment match between a model and the runtime image based upon the total score can be selected. The set of probes is illustratively preregistered with respect to each of the candidate poses before the step of applying. Before the step of applying, a gradient is computed for each location where each of the probes is applied. A gradient vector can also be computed for each location where each of the probes is applied by one of (a) determining a gradient field pixel which contains that location, and using the gradient vector corresponding to that gradient field pixel; (b) performing a sub-pixel interpolation of neighboring gradient field values with respect to that location; (c) determining a set of image pixels that are located nearest to that location, and applying an X kernel and a Y kernel to compute a whole-pixel gradient; or (d) determining X and Y gradients for a neighborhood of whole-pixel gradients around that location, and performing a sub-pixel interpolation of neighboring gradient field values with respect to that location. A magnitude of at least one of a direction vector of each of the probes and a gradient direction vector of each of the probes can be normalized to a predetermined value (e.g. 1.0). Illustratively, normalizing includes one of (a) normalizing the magnitude of the direction vector to a predetermined magnitude; or (b) normalizing the magnitude of the direction vector to a magnitude that is a predetermined function of its raw magnitude. The system and method can also include normalizing of a magnitude of a direction vector of each of the probes during a training stage. Illustratively, the locations of applied probes on the runtime image can be determined by (a) normalizing direction vectors of each of the probes to a magnitude of 1.0, and (b) computing the offset positions as predetermined multiples of the normalized probe direction vector. In embodiments, the system and method can also include computing offsets in a perpendicular direction to each of the direction vectors, respectively. Additionally, computing the score can include performing a dot product of a direction of each of the probes and gradient vectors of the runtime image at a respective position of each of the probes. In embodiments a magnitude of one or more vectors of the probes can be normalized based on a normalizing function.

BRIEF DESCRIPTION OF THE DRAWINGS

The invention description below refers to the accompanying drawings, of which.

DETAILED DESCRIPTION

I. System Overview

Figure 1:
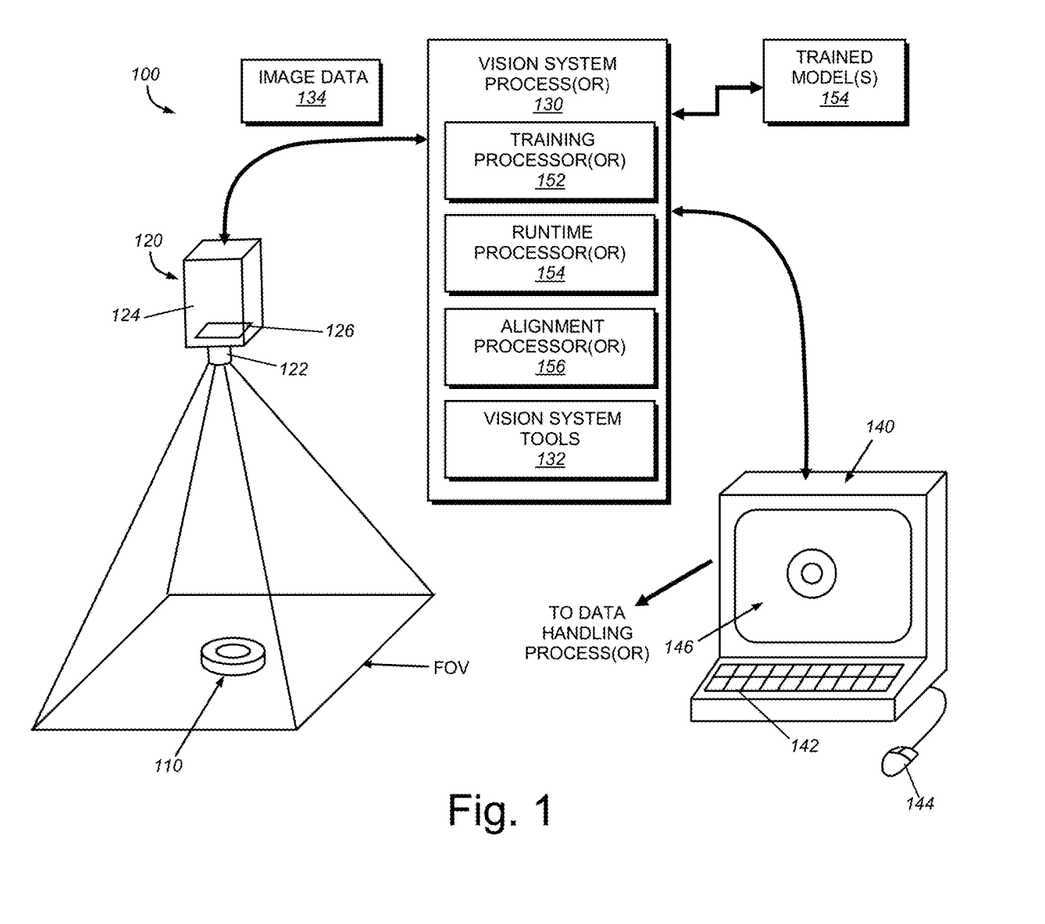
FIG. 1 is a diagram showing a vision system acquiring an image of an exemplary object, candidate poses of which are aligned with a trained model using probes according to an illustrative embodiment.

FIG. 1 shows a machine vision system 100 (also termed simply, "vision system") 100 for use in inspecting and/or analyzing features on the surface of an object that is imaged within the field of view (FOV) of a vision system camera assembly 120. The camera assembly 120 can be any acceptable arrangement of components and typically includes a lens assembly 122 and a camera body 124 that houses an image sensor (or "imager") 126, based upon any acceptable imaging technology, such as CCD or CMOS. The imager 126 can be arranged to acquire images in two dimensions (e.g. along x and y axes) in an array of image pixels that can be adapted to sense the scene in either grayscale or color. The camera body 124 can contain various image processing components that constitute a vision processor 130 that operates an associated vision process. The vision processor 130 operates upon the acquired images of the scene and can employ vision system tools 132 and other processes(ors) 132 to extract information from the acquired image data 134. This information can relate to features of interest and other items appearing within the image—for example vision system tools such as the well-known PatMax®, available from Cognex Corporation of Natick, MA, can be used to analyze features in the image and provide information on relative pose, alignment and other details—e.g. edges, blobs, etc. While some or all of the vision system processes can be instantiated within the body 124 of the camera assembly 120. It is expressly contemplated that some or all of the processes can be carried out by an interconnected (wired or wireless) computing device/processor, such as a purpose-built processor or a general purpose computer (e.g. server, PC, laptop, smartphone, tablet, etc.) 140, with appropriate user interface (e.g. keyboard 142, mouse 144, and display/touchscreen 146). The interconnected computing device/processor 140 can employ the processed image data 134 to carry out further utilization tasks by a downstream processor or device. For example, where the vision system carries out inspection tasks, the information can be used to provide quality control information to a database or to reject defective parts on a line. The information can also be used (e.g.) in logistics applications, by reading labels and/or ID codes on objects. A variety of other utilization tasks can also be undertaken with image data and associated information.

In the illustrative embodiment, the vision process and processor 130 includes a plurality of functional blocks and/or modules. These include a training process(or) 152 that handles training of model feature data for use in subsequent runtime processes where candidate poses of object features are analyzed for alignment relative to the model features. As described further below, model data 154 is generated by the training process(or) 152. This model data includes model/trained probes. These probes characterize the gradient of the model features at various positions. Note that trained or model image data can be based upon acquired images of an actual training object surface and/or synthetic image data. That is, the trained image or model can be specified by a description provided in (e.g.) a CAD model, synthetic square, etc. The term "model" should thus be taken broadly to include data sets that are specified generally free of reliance of actual acquired image pixel values.

The vision system process(or) 130 also includes a runtime process(or) 154 that performs various tasks related to the acquisition and handling of images of objects during runtime operation. Such tasks can include registering features in the image, performing optional smoothing and gradient analysis of features, identifying edges and other features using vision system tools (132) and transmission of runtime analysis results to data handling devices/processes(ors). These processes allow various candidate poses of the features of interest in the runtime image to be identified for subsequent alignment operations. Such runtime operations include alignment of candidate poses of objects and object features to the model using the alignment process(or) 156 according to an illustrative embodiment. As described below, the alignment process(or) matches probes to the gradient of runtime image features/contours in candidate poses based upon a score for each probe. More particularly, a score is computed for the given candidate pose of the trained model in the given image. This allows the match to accommodate a degree of local deformation in the contour (relative to the model) beyond what the pose specifies.

II. Training Model Probes

Figure 2:
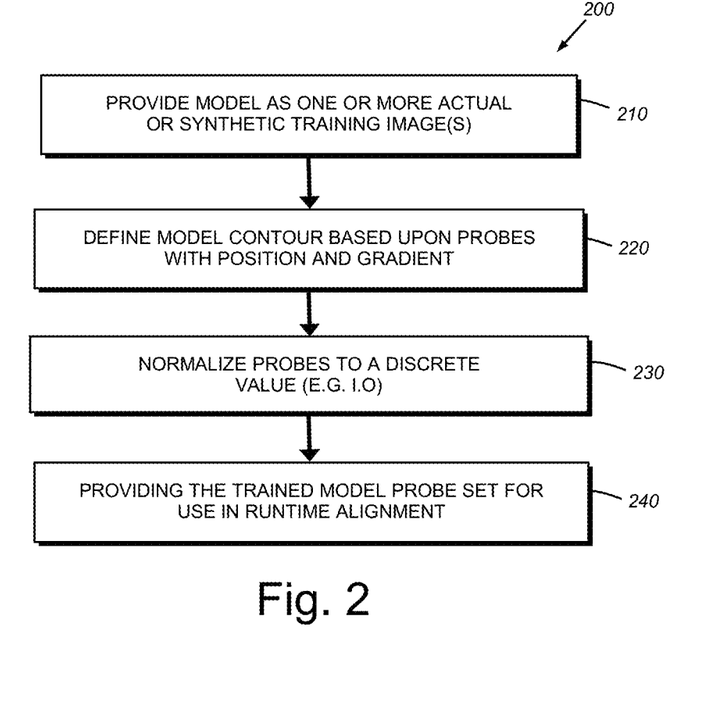
FIG. 2 is a flow diagram of a training procedure in which trained probes are generated from a model image contour/features.

With reference to FIG. 2, a procedure 200 for training a model feature consisting of one or more model contour(s) is shown. A model contour, or set of contours, is determined by any of several techniques that should be clear to those of skill. Each contour can define a handedness, which indicates the direction of gradient across it, or may not, in which case the polarity of the gradient can be ignored.

In step 210, the procedure 210 provides a model image that includes one or more contours. These can be provided based on an actual acquired image of a model object (that is representative of a desired version of the runtime object) or by synthetic data from (e.g.) a CAD representation of the object, as described above. Additionally, an actual image can be modified to generate the desired model contour(s).

Figure 3:
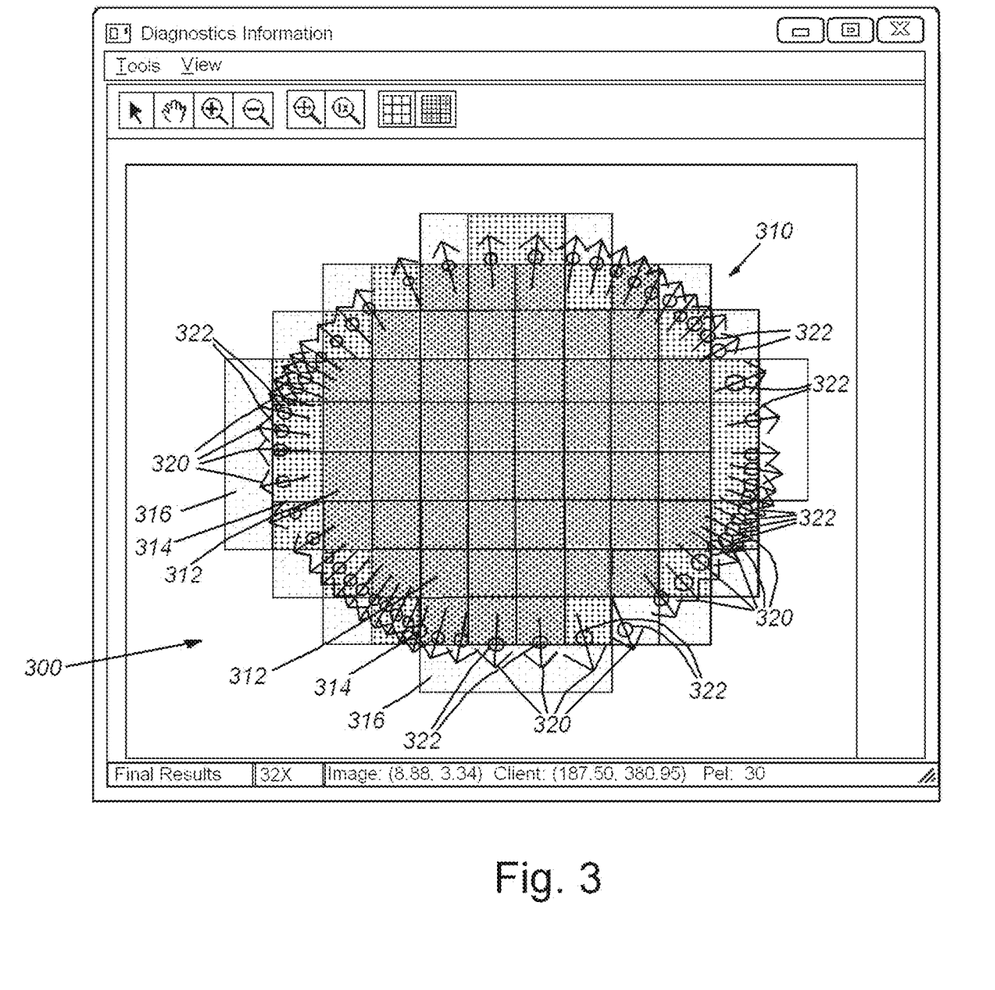
FIG. 3 is a diagram of a display of an exemplary model image contour showing trained probes associated therewith.
Figure 4:
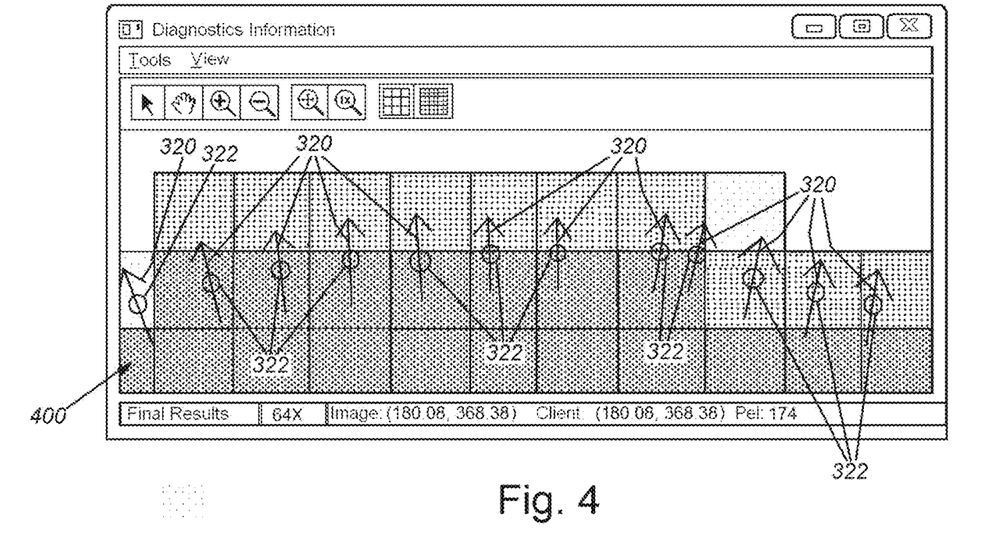
FIG. 4 is a diagram of a display of a plurality of trained probes showing center positions thereof with respect to an exemplary model contour gradient.
Figure 5:
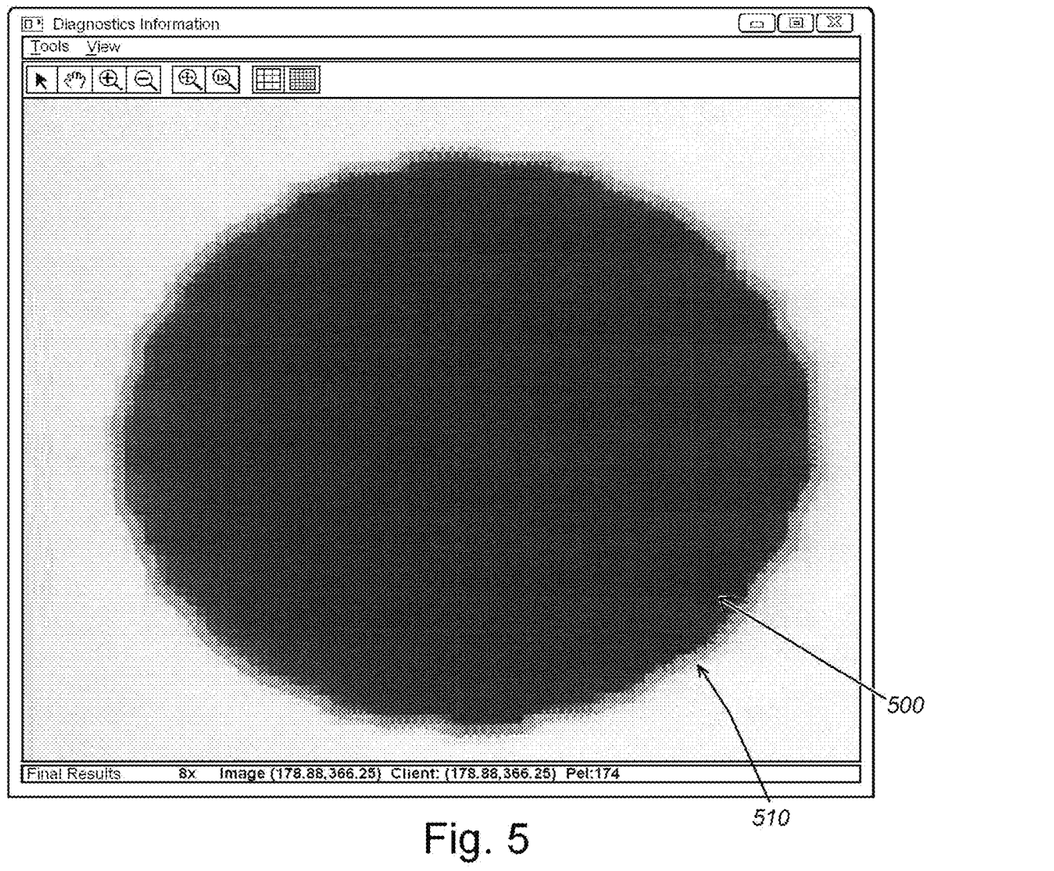
FIG. 5 is a diagram of a display of a set of trained probes surrounding the gradient of a model image.

As described in step 220, the model contour is represented by a discrete set of samples, called probes, which point in the direction of the gradient (perpendicular to the contour). For a grayscale model, the process 200 generally extracts the contour by examining the gradients and their connectivity, then selects a discrete set of probes to represent this contour. The generation of a set of probes can be accomplished in a manner generally clear to those of skill. Additional techniques, such as probe placement and balancing can be employed as appropriate. Such techniques, as well as more general background on probes, are provided in commonly assigned U.S. patent application Ser. No. 14/603,969, entitled PROBE PLACEMENT FOR IMAGE PROCESSING, by Simon Barker, the teachings of which are incorporated herein by reference as useful background information. Reference is made to FIG. 3, in which an exemplary display 300 of an elliptical object 310 is depicted. The contrast of the object at its edge defines a gradient. That is, individual pixels 312, 314 and 316 transition from dark to light. As such, a series of probes 320, represented by arrows defines the direction of the gradient. The probe has vector characteristics in that its length defines the magnitude of the gradient. Likewise, each probe 320 can define a center position 322 (the probe's actual location) that falls approximately on the designated edge of the object 310. The probes 320 along an exemplary contour 400 are shown in more detail in FIG. 4 with associated positions (circles 322). As shown in FIG. 5, a complete model of a shape 500 can be defined by the array of trained probes surrounding the perimeter 510 of the shape, each probe designated by an arrow that (in this example) points outwardly to represent the direction of the gradient.

Referring further to the procedure 200 (FIG. 2), the probes can optionally be normalized (step 230) so that their maximum length (magnitude) is a predetermined value, such as 1.0. All probes have a magnitude of between 0 and 1 in this exemplary embodiment. This normalized probe set is then stored, or otherwise provided to the runtime stage of the process for use in matching candidate poses to the model (step 240).

III. Runtime Operation

Figure 6:
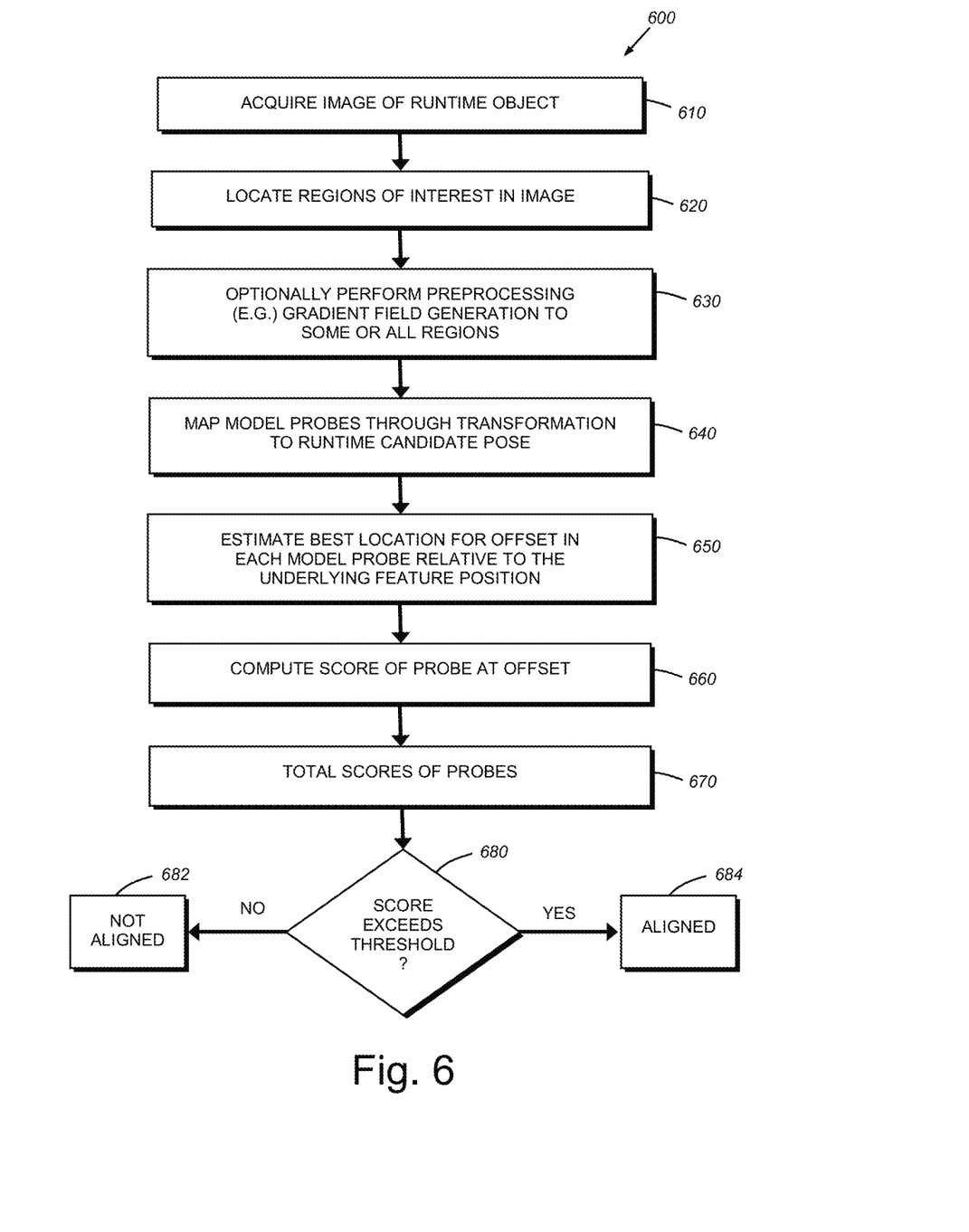
FIG. 6 is a flow diagram of a procedure for applying trained probes to a runtime candidate pose and scoring a match of the probes to the runtime candidate pose.

With reference to the runtime procedure 600 of FIG. 6, the vision system (100) acquires an image of a runtime object, or image data is otherwise provided (e.g. from storage) to the vision system, process(or) 130 (in step 610). Illustratively, the image is a 2D array whose elements may represent greyscale, a color's intensity, depth information, etc. In step 620, the vision system process(or) 130 locates regions of interest—for example parts of the image containing contrasting features, contours and/or shapes. Optionally, the vision system process(or) can also generate a fully populated "gradient image," from this image in step 630. A gradient image specifies a derivative, in each of x and y directions, for each element of a 2D array. This array can be the same as the image's array, or can be offset by a fraction of a pixel (e.g. one-half pixel) due to the kernel used to compute the gradient. Alternatively the gradient image array can define an arbitrary relationship with respect the acquired image's array—for example if decimation is performed as part of the gradient operation.

Note that the imager can be adapted to acquire 3D image data in various embodiments. The principles described herein can be extended to accommodate such data in a manner that should be clear to those of skill.

In step 640, a pose transform occurs. The pose transform specifies a mapping from the trained pose of the probes to the candidate pose of the probes in the image. This pose could be as simple as just an x and y offset, or can optionally include some or all affine degrees of freedom. Alternatively, the pose transform can define an arbitrarily complex non-linear mapping.

Illustratively, the vision system process(or) can request the user (e.g. via the user interface) during setup or runtime to specify (or the system can automatically specify) the amount of deformation allowed between the model and the runtime image/contour. This deformation can be specified in pixel units or another appropriate metric. More generally, the user specifies the amount of local deformation that is still considered a good match. In an embodiment, this value can be an integer, and in another embodiment the value can be a floating point value. Illustratively, a specified allowable deformation of 1.0 is equal to the linear dimension of one pixel. The user can convert a physical measurement unit (e.g. millimeters, microns, etc.) to pixel units via a previously established calibration relationship.

Figure 7:
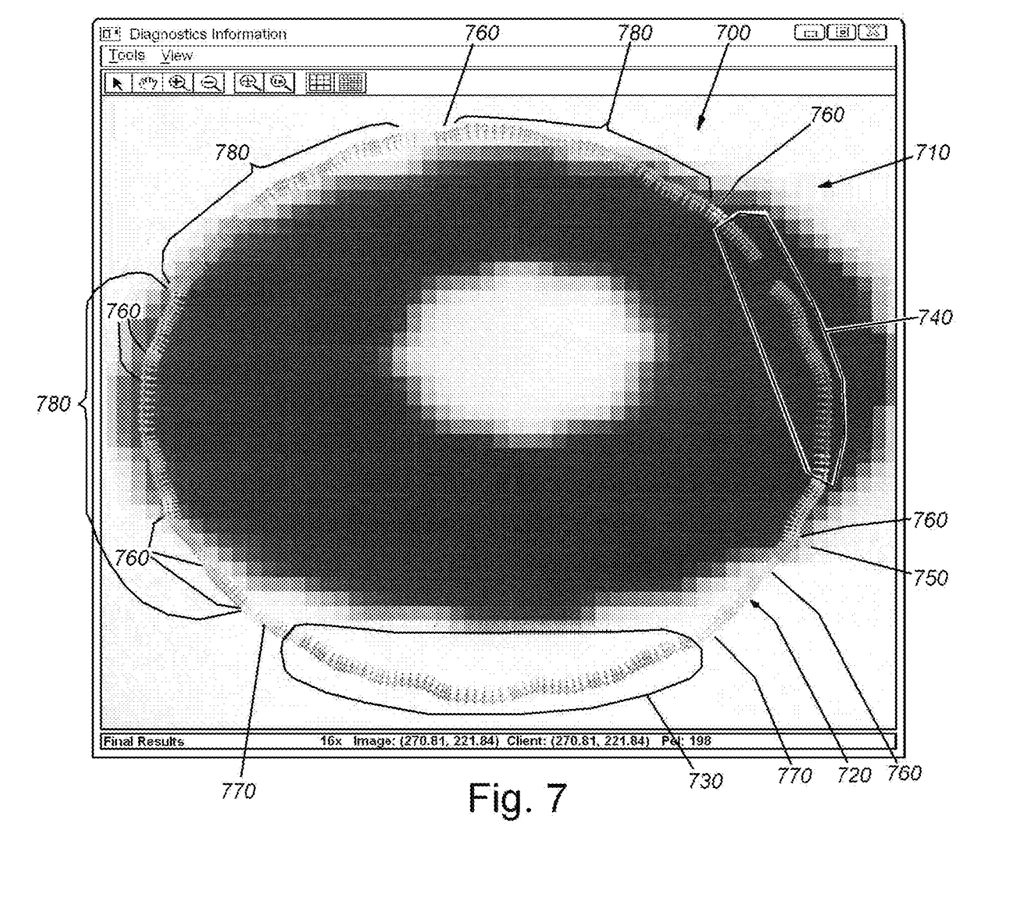
FIG. 7 is a diagram of a display of an exemplary runtime image with deformation aligned with a set of trained probes.

As described above, a transformation of each candidate pose occurs. The trained (model) probes are mapped through the transformation and a mapped location is established with directions for each probe. FIG. 7 shows a display 700 of a runtime object image 710 that includes a degree of deformation relative to the model, defined by the set of model probes 720. The circled regions 730 and 740 represent probes that are significantly misaligned (outward and inward, respectively) from the runtime contour edge 750 due to deformation. This misalignment is addressed by scoring as now described.

To score the transformation in an illustrative embodiment, each probe is first individually scored, and then the scores are summed. For each probe, the system process attempts to find (estimate) a matching gradient in the image. The process also attempts to find a "nearby" gradient that matches so as to accommodate a small degree of inherent deformation between the candidate and the model. In general, the process attempts to find a potential match that lies along a gradient direction of the probe. As such it is expected that another probe resides on each side of the subject probe in the direction along the edge (perpendicular to the gradient direction). Likewise, the process does not apply full credit to a segment that is shorter than expected. The resulting technique efficiently estimates probe locations to test, particularly due to the fact that the subject probe's (vector) direction is the direction that is most desirably tested for that particular location on the contour, and the probe's length has been normalized to 1.0.

Figure 8:
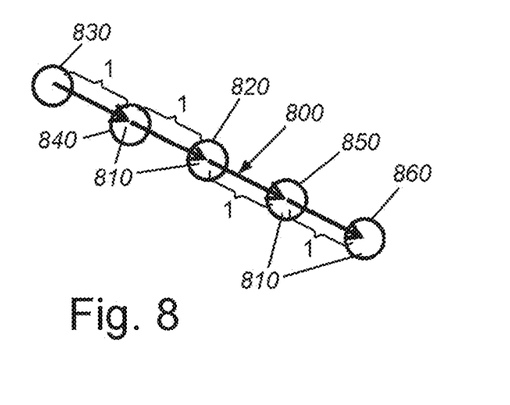
FIG. 8 is a diagram of an exemplary probe showing a set of offsets at predetermined increments used for estimating the best position with respect to a runtime contour gradient.

In accordance with step 650 (FIG. 6), the process can add multiples of the probe direction (incremental offsets) to the transformed location to produce a set of test locations forming a line. By way of example, and as shown in FIG. 8, an exemplary probe 800 defines a direction as represented by arrowhead(s) 810. The transformed position of the probe 800 is identified by the circle 820. In this example, the user-defined (normalized) allowable deformation is set to 2. Thus, in addition to the central location (circle 820), which defines a test location for determining gradient on the runtime image, four additional test locations 830, 840, 850 and 860, each at an incremental offset of 1 unit are provided. On each of opposing sides (830, 840 on one side and 850, 860 on the opposing side) of the central position 820. These offset locations 830, 840, 850 and 860 are particularly computed by adding multiples of the probe direction (black vectors), specifically −2, −1, 0 (position 820), 1, and 2.

For efficiency, and because the peak of a bilinearly interpolated space typically occurs at a sample location, the process determines the whole pixel gradient bin into which each sample location falls. This can result in testing the same location twice, but it is more efficient to blindly test than to determine if the same location is subjected to multiple tests. Illustratively, the process notes the test location with the maximum dot-product of the (normalized) probe direction and the raw gradient magnitude vector (at the test location).

In a further embodiment it is noted that probe positions can be selected from (e.g.) a predetermined set of positions based on the gradient direction. By way of non-limiting example, the system selects four sets of offsets, which represent sliding the probe at one of 0, 45, 90, or 135 degrees. For 45 degrees, for example, the offsets can be normalized values (−1, −1), (0,0), and (1,1). To select the appropriate direction the system can select the pre-computed angle closest to the actual angle of the mapped probe gradient.

In step 660 of the procedure 600 (FIG. 6), the offset positions of each probe are then subjected to final scoring. For the final score of each probe, the system normalizes the selected gradient magnitude vector. In general, the normalization function ensures that probe lengths are maximized to a given value—for example 1.0.

Figure 9:
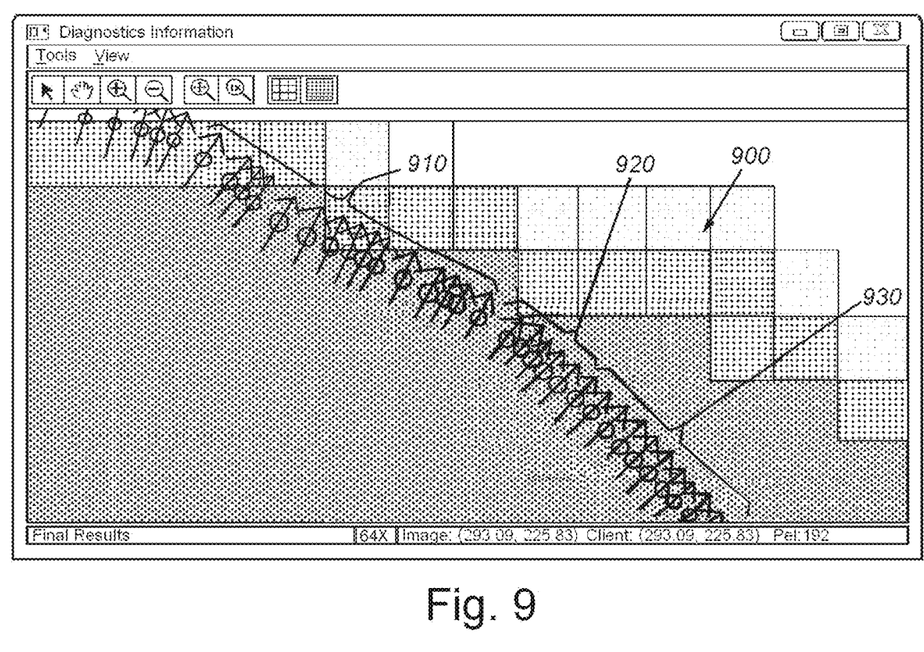
FIG. 9 is a diagram of a display of a plurality of probes showing a transition from a match to an exemplary runtime contour gradient to a weak match to a non-match.

Referring again to FIG. 7, showing trained probes 720 mapped onto a runtime image 710, the probes in the circled regions 730 and 740 represent a very low score as they are substantially offset from the runtime image gradient. These areas are considered a clear non-match. Likewise adjacent areas 770 define a low score, below a threshold, and are considered a non-match. Transition areas 760 are a lesser match, either because the gradient is weak (even at the best location offset tested) or because the angle match is less than ideal. The remaining probes at or near the runtime gradient (e.g. regions 780) generally represent a probe score near to 1, which define a very strong match. Note that some probes near the top of the image, and slightly to the left of the image do not land on any gradient, but are still marked green due to their close proximity to a matching gradient. Notably, probes that are positioned too far from matching features receive score approaching 0 even when allowing some deformation. Otherwise, the system could not effectively differentiate between a matching and non-matching pattern. FIG. 9 shows a portion of a contour 900 where the probes transition from a strong match (region 910), to a weak match (region 920) to a non-match (region 930), based upon proximity to the runtime gradient.

Referring again to the runtime procedure 600 of FIG. 6, having scored the probes, in step 670, the system then computes the sum of all such probe scores. The final score can be normalized. That is, the maximum possible value of a score computed in this manner is equal to the number of probes, and the score is normalized to a range of 0 to 1 by dividing the total sum by the number of probes. A score of this type can be computed for each appropriate candidate pose. Scores that exceed a given threshold (decision step 680) are deemed to be aligned poses (step 682) and those that do not exceed a given threshold are not aligned (step 684).

IV. Conclusion and Additional Considerations

The above-described system and method allows for a reasonable degree of deformation between the model at training time and candidate poses of a runtime object image at runtime to be accommodated in a manner that is computationally efficient and accurate—capable of handling/matching details in the runtime image. It is contemplated that deformation and distortion can occur in the image or underlying object, and modelling all such possible transformations is impractical, so the alignment process(or) herein generally employs a subset of possible transformations—for example rigid transformations specified by x, y, and in-plane rotation $\Theta$. To accurately report the best candidates, the scoring process is, thus, generally tolerant to the unmodeled transformations, which typically manifest as local deviation from the transformed boundary. The system and method generally operates at a maximal speed to ensure that a time budget that can be a few milliseconds in length is met and to allow scoring of the many possible candidate poses that can occur in a runtime image.

In general, the foregoing system and method operates to accomplish these goals in a training stage and a runtime stage. During the training stage, a set of probes is selected, with each of the probes defining a position and a direction, to represent the model. During the runtime stage, a mapped set of probes specified by a transform of the training probes is then computed. The best scoring position for each probe is computed or estimated out of a discrete set of offsets from the mapped location. Those offsets are oriented relative to the mapped probe's direction, and a match score for each probe is computed as the score of that probe at its best match position. A total score that is a weighted sum or product of the individual probe scores is then computed. Optionally, the system and method can compute a fully populated gradient field in a preprocessing step prior to aligning the candidate poses with the trained probes. This can be accomplished by computing the corresponding gradient vector for each location where a probe is tested. More particularly, the gradient field pixel which contains that location is determined, and the gradient vector corresponding to that gradient field pixel is employed. Alternatively, the system performs a sub-pixel interpolation of neighboring gradient field values—for example by a bilinear interpolation of the four neighboring x gradients and a bilinear interpolation of the four neighboring y gradients. The system can also determine a set of image pixels that are located nearest to that location, and applying an X kernel and a Y kernel to compute the whole-pixel gradient.

Illustratively, the X and Y gradients can also be determined as above, but for a neighborhood of whole-pixel gradients, and then the gradient values as described above can be determined. Also, the magnitude (length) of either the probe direction vector and/or the gradient direction vector can be normalized in a manner that can be applied independently to probe or gradient. More particularly, a direction vector magnitude can be normalized to a predetermined magnitude (e.g. 1.0), or to a magnitude that is a predetermined function of its raw magnitude. Illustratively, the length of all probe direction vectors can be normalized during the training stage. The above-described score of a probe and a corresponding gradient direction can be computed by a dot-product of the (optionally normalized) probe direction and corresponding (optionally normalized) gradient direction vectors. Illustratively, a fixed point representation of the vectors can be employed for computational efficiency.

In illustrative embodiments, the system determines the set of locations to test relative to the location of the mapped probe, by (a) normalizing all probe direction vectors to a length of 1.0 (e.g. during train stage), and (b) computing offset positions as predetermined multiples of the normalized probe direction vector (for example, if the allowed deformation is 3, then the tested offsets would be −3, −2, −1, 0, 1, 2, 3 each multiplied by the probe's normalized direction). Alternatively the system can employ predetermined offsets in the perpendicular direction to determine the set of locations—which are specified by the vector (−y, x), where (x, y) are the components of the probe's normalized direction vector. For example, the cross product of {−1, 0, 1 multiplied by (−y, x)} with {−3, −2, −1, 0, 1, 2, 3 multiplied by (x, y)}

In various embodiments, the system can also normalize the (total) score to a range of 0 to 1 by (a) dividing by the theoretical maximum score of the metric (i.e. the score of a perfect match for every probe), or (b) dividing by the score of the trained pose in a trained image.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for analyzing candidate poses of a runtime image with a vision system processor comprising:
   an analysis process that receives a set of probes with location and gradient direction based on a trained model of image data and provides a one or more candidate poses based upon a runtime image and applies probes from the set of probes to at least one of the candidate poses, the applied probes each respectively including a discrete set of position offsets with respect to the gradient direction thereof, wherein the analysis process is arranged to normalize a magnitude of at least one of a direction vector of each of the probes or a gradient direction vector of each of the probes; and
   an alignment process that analyzes each of the probes relative to a predetermined match parameter associated with one of the discrete set of position offsets.

2. The system as set forth in claim 1, wherein the alignment process is arranged to generate an individual probe score for each of the probes, respectively, and the predetermined match parameter is a best match score.

3. The system as set forth in claim 1, further comprising a training process that generates the set of probes with a position and a direction that represents the trained model.

4. The system as set forth in claim 2, wherein the set of probes has, associated therewith, a total score that is a weighted sum or product of the individual probe scores, in which the analysis process operates (a) concurrently as the probe scores are generated or (b) subsequent to generating of some or all of the individual probe scores.

5. The system as set forth in claim 4, wherein the alignment process selects a best alignment match between a model and the runtime image based upon the total score.

6. The system as set forth in claim 1, wherein the set of probes are preregistered with respect to each of the candidate poses before each of the probes is applied.

7. The system as set forth in claim 1, wherein the analysis process is arranged to compute a gradient for each location where each of the probes is applied.

8. The system as set forth in claim 7, wherein the analysis process is arranged to compute a gradient vector for each location where each of the probes is applied by one of;
    (a) determining a gradient field pixel which contains that location, and using the gradient vector corresponding to that gradient field pixel,
    (b) performing a sub-pixel interpolation of neighboring gradient field values with respect to that location,
    (c) determining a set of image pixels that are located nearest to that location, and applying an X kernel and a Y kernel to compute a whole-pixel gradient, or
    (d) determining X and Y gradients for a neighborhood of whole-pixel gradients around that location, and performing a sub-pixel interpolation of neighboring gradient field values with respect to that location.

9. The system as set forth in claim 1, wherein the analysis process is further arranged to one of;
    (a) normalize the magnitude of the direction vector to a predetermined magnitude, or
    (b) normalize the magnitude of the direction vector to a magnitude that is a predetermined function of its raw magnitude.

10. The system as set forth in claim 1, wherein the analysis process is further arranged to normalize a magnitude of a direction vector of each of the probes during a training stage.

11. The system as set forth in claim 1, wherein the analysis process is arranged to determine the locations of the applied probes on the runtime image by;
    (a) normalizing direction vectors of each of the probes to a magnitude of 1.0, and
    (b) computing the offset positions as predetermined multiples of the normalized probe direction vectors, respectively.

12. The system as set forth in claim 11 wherein the analysis process is arranged to compute a perpendicular direction to each of the direction vectors, respectively.

13. The system as set forth in claim 11, wherein the analysis process is arranged to compute a dot product of a direction of each of the probes, respectively, and gradient vectors of the runtime image at a respective position of each of the probes.

14. The system as set forth in claim 11, wherein the analysis process is arranged to normalize a magnitude of one or more vectors of the probes, respectively, based on a normalizing function.

15. A system for analyzing a runtime image comprising:
    at least one processor configured to:
        receive a set of probes with location and gradient direction based on a trained model of image data;
        receive a runtime image;
        provide a candidate pose based on the runtime image;
        apply probes from the set of probes to the candidate pose, the applied probes each respectively including a discrete set of position offsets with respect to the gradient direction thereof;
        normalize a magnitude of at least one of a direction vector of each of the probes or a gradient direction vector of each of the probes; and
        analyze each of the applied probes relative to a predetermined match parameter associated with one of the discrete set of position offsets.

16. The system of claim 15, further comprising a camera assembly in communication with the at least one processor and configured to acquire the runtime image.

17. The system of claim 15, wherein the at least one processor is further configured to generate an individual probe score for each of the probes, respectively, and wherein the predetermined match parameter is a best match score.

18. A system for analyzing candidate poses of a runtime image with a vision system processor comprising:
    an analysis process that receives a set of probes with location and gradient direction based on a trained model of image data and provides a one or more candidate poses based upon a runtime image and applies probes from the set of probes to at least one of the candidate poses, the applied probes each respectively including a discrete set of position offsets with respect to the gradient direction thereof,
    wherein the analysis process is arranged to compute a gradient for each location where each of the probes is applied, and
    wherein the analysis process is arranged to compute a gradient vector for each location where each of the probes is applied by one of;
        (a) determining a gradient field pixel which contains that location, and using the gradient vector corresponding to that gradient field pixel,
        (b) performing a sub-pixel interpolation of neighboring gradient field values with respect to that location,
        (c) determining a set of image pixels that are located nearest to that location, and applying an X kernel and a Y kernel to compute a whole-pixel gradient, or
        (d) determining X and Y gradients for a neighborhood of whole-pixel gradients around that location, and performing a sub-pixel interpolation of neighboring gradient field values with respect to that location; and
    an alignment process that analyzes each of the probes relative to a predetermined match parameter associated with one of the discrete set of position offsets.

19. The system as set forth in claim 18, wherein the alignment process is arranged to generate an individual probe score for each of the probes, respectively, and the predetermined match parameter is a best match score.

* * * * *